March 4, 1941.   M. E. COLLINS   2,233,914
MONITORING FOR SOUND SYSTEMS
Filed April 30, 1938
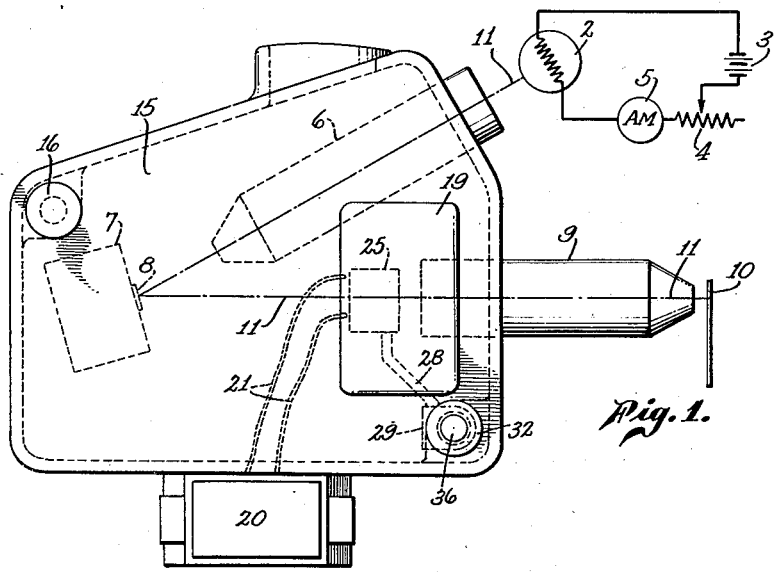
Fig. 1.
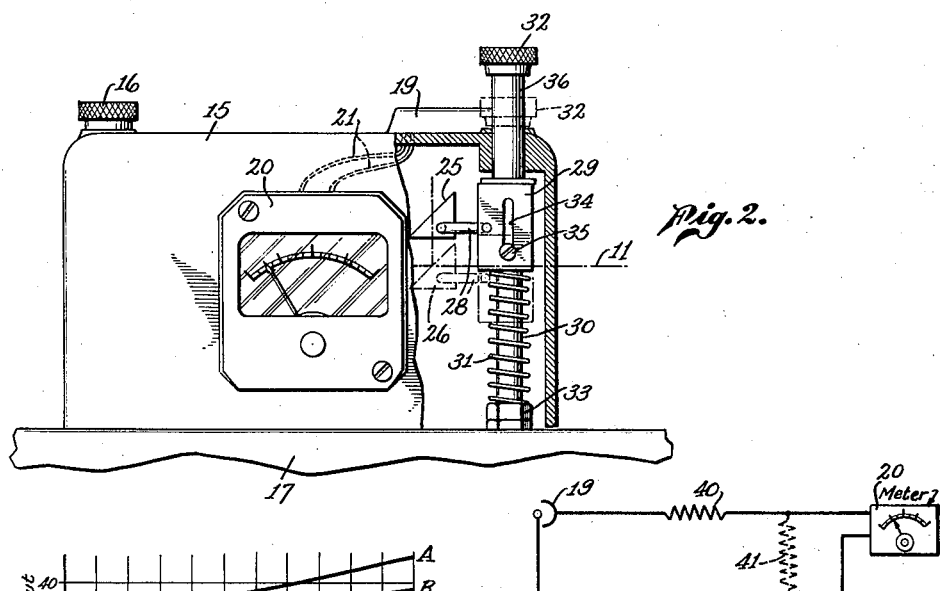
Fig. 2.
Fig. 3.
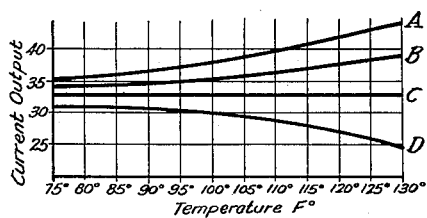
Fig. 4.
Inventor
Milford E. Collins
By
ATTORNEY Patented Mar. 4, 1941

2,233,914

UNITED STATES PATENT OFFICE 2,233,914

MONITORING FOR SOUND SYSTEMS

Milford E. Collins, Hollywood, Calif., assignor to Radio Corporation of America, a corporation of Delaware Application April 30, 1938, Serial No. 205,239

6 Claims. (Cl. 88—23)

This invention relates to photographic sound recording apparatus, and particularly to apparatus for monitoring a recording light beam prior, during or subsequent to the actual recording operation. It is similarly useful for monitoring the light beams of reproducing apparatus.

Methods of and apparatus for photographically recording sound on a moving film are well known in the art. Although all photographic systems employ some form of light for activating the film in accordance with sound waves, there are various methods of impressing the light on the film and various methods of modulating the light beams. In such systems it is essential, in order to avoid distortion, that a source of light be employed which does not vary independently of the sound waves being recorded. It is also essential in this type of sound recording that the optical elements employed be in adjustment during recording so that the various apertures and slits be in focus in their proper planes.

To determine the condition of these elements, several methods of testing have been proposed, some of which measure the quantity of the light after it is passed through the film. Certain others intercept and measure portions of the beam outside the active zone and thus obtain some idea of the beam in the active zone. Although these various methods give a certain indication of the intensity of the light beam in the active zone, they are, of course, affected by variations in the film and non-proportionality of the light beam at different intensites, and do not, therefore, give a true indication of the actual beam reaching the film.

An object of the present invention, therefore, is to test and/or measure the quantity and quality of the light beam as actually impressed on the emulsion of the recording medium or on the sound track.

Another object of the invention is to facilitate the measurement of the light beam as impressed on the film prior, during and/or subsequent to recording or reproduction.

In sound recording, it is not only particularly desirable to measure the light beam actually reaching the film, but also to make such measurements so that they correspond to the effect of the light at the time of impression on the film. The sensitivity of a film emulsion varies with temperature so that less light is required to produce a certain exposure at the higher temperatures over which film is actually used than at the lower temperatures. The measuring and testing device disclosed herein is designed to coincide with the emulsion temperature characteristic of the film so that not only is the active light zone measured, but this light is measured with respect to the sensitiveness of the film emulsion at the time the measurement is taken.

A further object of the invention, therefore, is to measure the quantity and quality or the photographic effectiveness of an active light beam with respect to the sensitiveness of the film emulsion on which the light beam is being impressed.

Although the novel features which are believed to be characteristic of this invention are pointed out with particularity in the claims appended hereto, the manner of its organization and the mode of its operation will be better understood by referring to the following desription read in conjunction with the accompanying drawing forming a part thereof, in which Figure 1 is a plan view of the invention embodied in a variable area galvanometer type of sound recording system well known in the art;

Figure 2 is an elevational view partially in section of the apparatus of Fig. 1;

Figure 3 is a schematic diagram of the measuring circuit of the invention; and

Figure 4 is a graph showing several possible current-temperature characteristics of the measuring circuit of Fig. 3.

Referring now to Fig. 1, in which the optical system of a well known type of sound recorder is illustrated diagrammatically, a light beam is produced by a lamp 2 energized from a source 3 under control of a rheostat 4 as indicated by an ammeter 5. Light from the lamp is projected through an optical assembly 6 to a galvanometer 7 having a modulating mirror 8 from which it is reflected through a second optical assembly 9 for impression upon a film 10, as shown by the center light-ray line 11. The optical assembly 6 contains a mask for defining the light beam to a particular shape, while the optical assembly 9 contains a slit for further limiting the beam, the image of the slit being projected upon the film 10 as is well known in the art. The assemblies 6 and 9 project within a housing 15 which may be fastened by a bolt 16 to a base plate 17. The galvanometer 7 is also covered by the housing 15. In a boss in the upper portion of the housing 15 is positioned a light-sensitive element 19 such as a selenium, photoelectric, or copper-oxide cell which is connected to a meter 20 by means of conductors 21.

To obtain the light beam 11 upon the cell, a 45°-angle reflector 25, within the housing 15, is adjustable to a position 26 (see Fig. 2) where it intercepts the beam and reflects the beam upwardly to the cell 19. Under normal conditions, the mirror 25 is above the light beam and does not interfere with the projection thereof to the film 10. The mirror 25 may be quickly inserted in the light beam since it is mounted upon an arm 28 attached to a cylindrical sleeve 29 mounted on a stud 30 as shown. A compression spring 31 surrounding the stud 30 between the sleeve 29 and a nut 33 maintains the sleeve 29, and consequently the mirror 25, out of the beam. For the purpose of lowering the mirror 25 against the compression of the spring, a flanged rod 36 having a knurled top 32 is mounted coaxially with the stud 30 and extends exteriorly of the housing 15. The sleeve 29 is guided on the stud 30 by the slot-and-pin combination 34—35.

Thus, to at any time determine the actual quantity of the light beam being projected to the film, it is only necessary to depress the rod 36 so that the beam 11 is deflected to the cell 19, where the output thereof may be read upon the meter 20. When different components of the light beam are to be determined, an appropriate light filter may be inserted in front of cell 19 to determine the quality of the beam. Thus, it may be determined that a reading of 20 on meter 20 provides the proper exposure and that the current to lamp 2 is 7.2 amperes. Should it then become necessary to substitute a new lamp for lamp 2, the current to the new lamp should be adjusted so that the meter 20 reads 20 regardless of the reading at meter 5, since high intensity recording lamps are not sufficiently uniform to permit reliance on their current consumption as an accurate guide to their intensity. Also, the physical spacing of the elements of different lamps changes the light intensities therefrom for a given input current which, of course, can be brought to the proper value by measurement on meter 20.

Referring now to Fig. 3, the photosensitive element 19 is shown connected to the meter 20 through a series resistance 40 and a shunt resistance 41, the resistance 41 being shown in dotted lines, as will be explained hereinafter. In Fig. 4, four characteristics A, B, C and D are shown between the current output of the cell 19 and the temperature of the cell over a range between 75° and 130° F. The same cell may follow any one of these characteristics, depending upon the load to which it is connected. That is, the higher the load impedance, the more drooping the characteristic will be. For instance, the characteristic A represents a low impedance termination, while characteristic D represents a high impedance termination, so that for a particular type of photosensitive cell, the proper choice of either a series resistance 40 or a shunt resistance 41, depending upon the meter impedance itself, will provide the desired characteristic which may be ordinarily a flat characteristic C. With such a characteristic, the reading of meter 20 will be the same for all exposures over the temperature range.

However, as stated above, film emulsions generally become more sensitive with increase in temperature such that a film recorded in the desert at high temperatures requires less light to obtain the same exposure as film used at lower temperatures, such as in air-conditioned studios. Temperatures may also change during the time consumed in recording one or more sequences, thus varying the output of light required for a uniform exposure. With the present invention the light measuring circuit will automatically follow the temperature changes as they vary the sensitivity of a certain light sensitive emulsion. The characteristics A and B of Fig. 4, therefore, may also be considered as representing characteristics between sensitiveness and temperature of films with different emulsions. In the present invention the terminating impedance of the cell 19 might be chosen to accommodate any particular emulsion being used for sound recording, so that the output of the cell 19 will automatically vary in accordance with either of the characteristics shown at A and B. Thus, in the example given above, it might be found that the reading of 20 at meter 20 and a reading of 7.2 amperes at meter 5 is correct at 85° F., but that meter 5 will only read 7.0 amperes at 125° F. when meter 20 still reads 20. This may be as it should be for a certain emulsion, since the meter 20 indicates the intensity of the light on the film for proper exposure and the film in this case is more sensitive at the higher temperatures, thus requiring lower light intensity and less current to the lamp.

Thus it will be seen that the present invention not only measures the actual light which is being utilized for impression upon the emulsion of the film, but may automatically give a reading which corresponds to the photographic effectiveness of the light beam with respect to the sensitiveness of the emulsion at the time of measurement. It is also to be realized that this measurement may be taken prior to recording to aid in optical adjustments and in the interchange of lamps without the necessity of density tests, or may be taken after a sequence has been recorded to determine the condition of the system at that time, or may be made at any comparatively short silent period during the sequence, since it is only necessary to depress the knob 32 and read the meter 20 which is in direct view of the operator during recording. Not only is the measurement a true and accurate measurement of the light beam, but the taking of the measurement does not interfere in any manner with any of the adjustments of other elements of the recording system.

I claim:

1. The method of measuring the photographic effectiveness of the actual light rays projected upon a light sensitive emulsion in accordance with the varying reaction of said emulsion to said light rays with changes in temperature of said emulsion, comprising automatically varying the sensitivity of the measurement of said rays to correspond with the light sensitivity characteristic of the emulsion.

2. The method of measuring the photographic effectiveness of light impressed upon a light sensitive emulsion having a sensitivity characteristic automatically varying with temperature, comprising varying the measurement of said light to correspond to the temperature-sensitivity characteristic of said light sensitive emulsion.

3. In a system for determining the proper exposure of a light sensitive emulsion in accordance with its temperature sensitivity characteristic, means for supporting said light sensitive emulsion, a photoelectric device, means for deflecting light directed toward said light sensitive emulsion to said photoelectric device, means for indicating the output of said photoelectric device, and circuit means interconnecting said photoelectric device and said indicating means, said circuit means providing said photoelectric device and indicating means with a temperature characteristic which automatically follows the temperature sensitivity characteristic of said emulsion.

4. A light measuring system for photographic apparatus for determining the proper exposure of a light-sensitive emulsion comprising a housing, means for directing a pre-formed beam of light through said housing, a photoelectric device on said housing, a meter connected to said device, said meter being located exteriorly of said housing, means for supporting said light-sensitive emulsion, said emulsion having a sensitivity characteristic varying with temperature, means within said housing for directing said beam of light to said photoelectric device, and fixed loading means connected intermediate said photoelectric device and said meter, said means automatically controlling the response characteristic of said meter in accordance with the variations in the sensitivity of said emulsion.

5. In a system for determining the proper exposure of a light sensitive emulsion varying in senstivity in accordance with the temperature thereof, the combination of means for supporting said emulsion, means for light impressing said emulsion, means for indicating the photographic effectiveness of the light impressed on said emulsion, and means providing said last-mentioned means with a response characteristic substantially coinciding with the temperature-sensitivity characteristic of said emulsion.

6. A system in accordance with claim 5 in which said means for indicating the intensity of the light comprises a photoelectric device and interconnected meter, and said means providing said last-mentioned means with said certain response characteristic comprises a fixed resistance connected intermediate said device and said meter for varying the response of said meter at different temperatures of said device for a given output of said device.

MILFORD E. COLLINS.